(12) United States Patent
Kishizoe

(10) Patent No.: US 8,210,222 B2
(45) Date of Patent: Jul. 3, 2012

(54) PNEUMATIC TIRE

(75) Inventor: Isamu Kishizoe, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 793 days.

(21) Appl. No.: 12/304,453

(22) PCT Filed: Aug. 29, 2006

(86) PCT No.: PCT/JP2006/316986
§ 371 (c)(1),
(2), (4) Date: Dec. 11, 2008

(87) PCT Pub. No.: WO2008/026255
PCT Pub. Date: Mar. 6, 2008

(65) Prior Publication Data
US 2009/0188595 A1 Jul. 30, 2009

(51) Int. Cl.
*B60C 11/11* (2006.01)
(52) U.S. Cl. .................. 152/209.8; 152/209.9; 152/902
(58) Field of Classification Search .............. 152/209.1, 152/209.8, 209.9, 902; D12/511, 512, 515, D12/526, 527, 544, 559, 579, 594, 599–603
See application file for complete search history.

(56) References Cited

U.S. PATENT DOCUMENTS 5,291,929 A * 3/1994 Daisho et al. ............ 152/209.28
5,702,545 A * 12/1997 Toyoshima et al. ........ 152/209.8
5,814,169 A * 9/1998 Yamaguchi et al. ...... 152/209.22
6,341,633 B1 * 1/2002 Adlon et al. ............... 152/209.3
6,595,255 B1 * 7/2003 Fukunaga et al. ......... 152/209.8
2001/0035244 A1 11/2001 Diensthuber et al.
2006/0151078 A1 7/2006 Colombo et al.

FOREIGN PATENT DOCUMENTS

| EP | 1 529 659 | 5/2005 |
|---|---|---|
| JP | 6-48120 | 2/1994 |
| JP | 11-321240 | 11/1999 |
| JP | 2003-146016 | 5/2003 |
| JP | 2004-017739 | * 1/2004 |
| JP | 2004-34903 | 2/2004 |
| JP | 2006-510534 | 3/2006 |
| WO | WO 2005/032855 | 4/2005 |

* cited by examiner

*Primary Examiner* — Steven D Maki
*Assistant Examiner* — Robert Dye
(74) *Attorney, Agent, or Firm* — Greer, Burns & Crain, Ltd.

(57) ABSTRACT

A pneumatic tire having improved driving stability and wear resistance on dry road surfaces and improved running performance on snow. The pneumatic tire includes a tread portion provided with first, second and third main grooves extending in a tire circumferential direction and a plurality of lug grooves each extending from one shoulder side to the other shoulder side. A width of a first land section defined between the first and second main grooves is set greater than a width of a second land section defined between the first and third main grooves, a plurality of inclined grooves are provided in the first land section, where each inclined groove communicates with at least three of the lug grooves while being inclined to the tire circumferential direction, and one end of each inclined groove is open to one of the lug grooves while the other end thereof is terminated within a block.

9 Claims, 4 Drawing Sheets

PNEUMATIC TIRE

This application is a U.S. National Phase under 35 U.S.C. §371, of International Application No. PCT/JP2006/316986, filed Aug. 29, 2006.

TECHNICAL FIELD

The present invention relates to a pneumatic tire favorably used as a studless tire, and more specifically, relates to a pneumatic tire having improved driving stability and wear resistance on dry road surfaces as well as an improved running performance on snow.

BACKGROUND ART

In general, it is difficult to achieve, in a pneumatic tire, both of the running performance on snow and the running performance on dry road surfaces. For example, a pneumatic tire for use on icy and snowy roads has a tread portion in which multiple main grooves each extending in the tire circumferential direction and multiple lug grooves each extending in the tire width direction are provided, so that a large number of blocks are defined by these main grooves and lug grooves (see, for example, Patent Document 1). Such a pneumatic tire for use on icy and snowy roads is capable of exerting, with an increased groove area, an excellent running performance on snow. However, such pneumatic tire for use on icy and snowy roads is insufficient in block rigidity because a soft tread rubber is employed in general. For this reason, currently-available pneumatic tires for use on icy and snowy roads are not satisfactory in the driving stability and wear resistance on dry road surfaces.

Patent Document 1: Japanese patent application Kokai publication No. 2004-34903

DISCLOSURE OF THE INVENTION

An object of the present invention is to provide a pneumatic tire having improved driving stability and wear resistance on dry road surfaces as well as an improved running performance on snow.

A pneumatic tire according to the present invention for achieving the above-described object is a pneumatic tire that is designed to be mounted on a vehicle so that a designated side of the tire should face to the outside of the vehicle. The pneumatic tire is characterized by including a tread portion provided with: a first main groove extending in a tire circumferential direction; a second main groove extending in the tire circumferential direction in a shoulder region closer to the center of the vehicle than the first main groove; a third main groove extending in the tire circumferential direction in a shoulder region farther from the center of the vehicle than the first main groove; and a plurality of lug grooves each extending from one shoulder side to the other shoulder side. Moreover, the pneumatic tire is characterized in that a width of a first land section defined between the first and second main grooves is set greater than a width of a second land section defined between the first and third main grooves, that a plurality of inclined grooves are provided in the first land section, each inclined groove communicating with at least three of the lug grooves while being inclined to the tire circumferential direction, and that one end of each inclined groove is opened to one of the lug grooves while the other end thereof is terminated within a block.

In the present invention, the tread portion is partitioned into the plurality of lines of land sections by the first, second, and third main grooves. The width of the first land section closer to the center of the vehicle is set greater than the width of the second land section farther from the center of the vehicle, and the inclined grooves each having a relatively large length are disposed in the first land section. This arrangement makes it possible to optimize the block rigidity, and to sufficiently secure the driving stability and wear resistance on dry road surfaces. Moreover, the inclined grooves disposed in the first land section make it possible to improve the running performance, such as driving stability and turnability, on snow.

In the present invention, the following structure is preferably employed for achieving a good balance between the running performance on snow as well as the driving stability and wear resistance on dry road surfaces. Specifically, each inclined groove may communicate with three of the lug grooves, so that four types of blocks defined by the three lug grooves and the inclined groove are disposed as a repeating unit in the first land section. In addition, a plurality of blocks defined by the plurality of lug grooves may be disposed in the second land section. Moreover, a surface area Sa of a block A located in a region, closer to the center of the vehicle and closer to the other end of the inclined groove, of the first land section; a surface area Sb of a block B located in a region, closer to the center of the vehicle and closer to the one end of the inclined groove, of the first land section; a surface area Sc of a block C located in a region, farther from the center of the vehicle and closer to the other end of the inclined groove, of the first land section; a surface area Sd of a block D located in a region, farther from the center of the vehicle and closer to the one end of the inclined groove, of the first land section; a surface area Se of a block E, adjacent to the block C, in the second land section; and a surface area Sf of a block F, adjacent to the block D, in the second land section, may be set to satisfy the following relations. It goes without saying that the surface area mentioned here is the surface area of a ground-contacting surface.

$Sa = Se \times 92\%$ to $100\%$, $Sb = Sf \times 110\%$ to $118\%$, $Sc = Se \times 110\%$ to $115\%$, and $Sd = Sf \times 95\%$ to $100\%$.

In addition, a groove width x1 of a part of the lug groove, closer to the center of the vehicle, in the first land section; a groove width x2 of a part thereof, between a pair of the adjacent inclined grooves, in the first land section; and a groove width x3 of a part thereof, farther from the center of the vehicle, in the first land section, preferably satisfy the following relations:

$x2 = x1 \times 101\%$ to $180\%$; and $x3 = x1 \times 60\%$ to $99\%$.

Further, it is also effective to employ the following structure for achieving a good balance between the running performance on snow as well as the driving stability and wear resistance on dry road surfaces. Specifically, the width of the first land section may be set at 50% to 70% of a tread contact half-width. The width of the second land section may be set at 15% to 35% of the tread contact half-width. A groove width y1 of a part of each lug groove, farther from the center of the vehicle, in the second land section may be set to be 40% to 50% of a groove width y2 of a part thereof, closer to the center of the vehicle, in the second land section. An inclination angle of the inclined grooves to the tire circumferential direction may be set at 10° to 30°. A sum of groove widths of the first, second, and third main grooves, may be set at 15% to 35% of a tread contact width.

Particularly, if importance is placed on the driving stability on dry road surfaces, it is preferable to employ the following structure. Specifically, each inclined groove communicates with three of the lug grooves. Among the three lug grooves in the first land section, while lug grooves located on both end sides communicate with the first main groove, a lug groove located in the middle does not communicate with the first main groove. Three types of blocks defined by the three lug grooves and the inclined groove are disposed as a repeating unit in the first land section. A block G located in a region, farther from the center of the vehicle, of the first land section is relatively large, as compared with a block A located in a region, closer to the center of the vehicle and closer to the other end of the inclined groove, of the first land section as well as a block B located in a region, closer to the center of the vehicle and closer to the one end of the inclined groove, of the first land section. In this case, it is preferable that an inclination angle of a part, contiguous with the block G, of the lug groove with respect to the tire circumferential direction be set at 60° to 90°.

In the present invention, when forming a pneumatic tire for use on icy and snowy roads represented by a studless tire, a plurality of sipes each extending in the tire width direction are preferably provided in each of land sections including the first and second land sections. The present invention provides significant operational effects when being applied to a pneumatic tire for use on icy and snowy roads; however, it is also possible to apply the present invention to an all-season pneumatic tire.

BEST MODES FOR CARRYING OUT THE INVENTION

Hereinafter, the configuration of the present invention will be described in detail with reference to the accompanying drawings.

Figure 1:
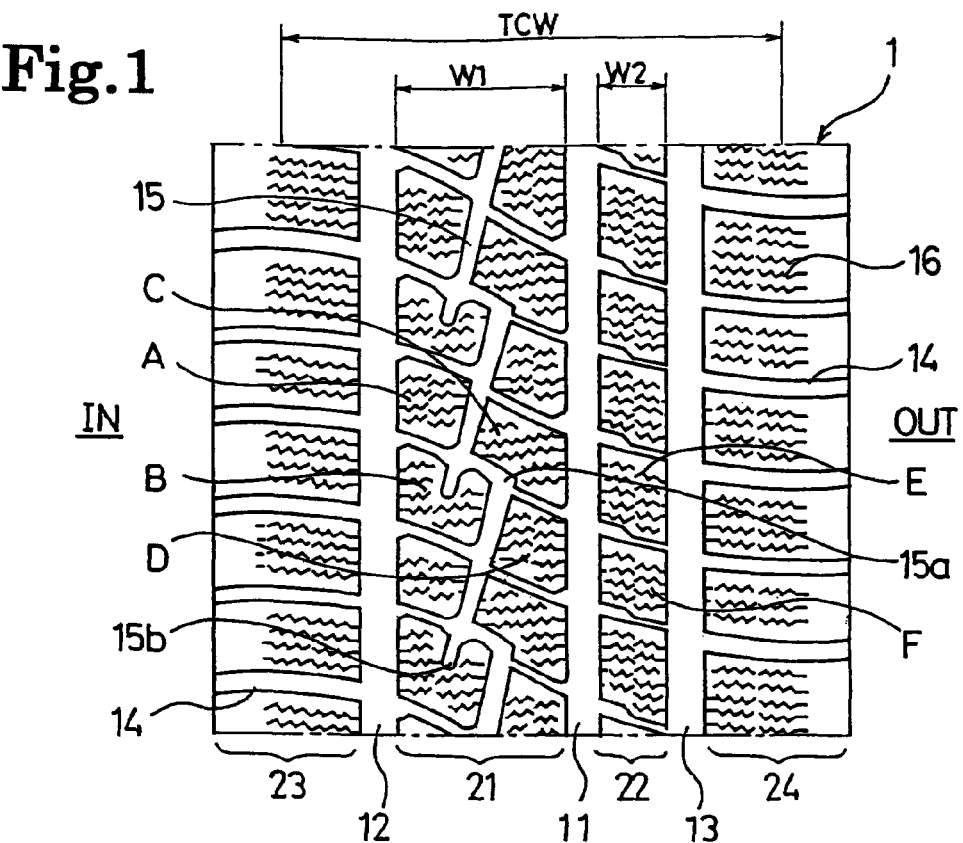
FIG. 1 is a developed view showing a tread pattern of a pneumatic tire for use on icy and snowy roads according to an embodiment of the present invention.

FIG. 1 shows a tread pattern of a pneumatic tire for use on icy and snowy roads according to an embodiment of the present invention. The pneumatic tire according to the present invention is designed to be mounted on a vehicle so that a designated side of the tire should face to the outside of the vehicle. In FIG. 1, "IN" indicates a side, facing to the center of the vehicle, of the tire, while "OUT" indicates the other side, facing to the outside of the vehicle, of the tire.

As shown in FIG. 1, a tread portion 1 includes therein a main groove 11 (first main groove), a main groove 12 (second main groove), a main groove 13 (third main groove), multiple lug grooves 14. The main groove 11 is formed to extend in a tire circumferential direction in a center region of the tread. The main groove 12 is formed to extend in the tire circumferential direction in a shoulder region closer to the center of the vehicle than the main groove 11. The main groove 13 is formed to extend in the tire circumferential direction in a shoulder region farther from the center of the vehicle than the main groove 11. The multiple lug grooves 14 are formed to extend from one shoulder side to the other shoulder side. The lug grooves 14 are curved and inclined in one direction with respect to the tire width direction, and arranged at intervals in the tire circumferential direction. With this arrangement, a land section 21 (first land section) is defined between the main groove 11 and the main groove 12, while a land section 22 (second land section) is defined between the main groove 11 and the main groove 13. Moreover, a land section 23 (third land section) is defined on the outer side, in the tire width direction, of the main groove 12, while a land section (fourth land section) 24 is defined on the outer side, in the tire width direction, of the main groove 13. The width of the land section 21 is greater than that of the land section 22.

In the land section 21, multiple inclined grooves 15 are formed, each of which communicates with three of the lug grooves 14 while being inclined to the tire circumferential direction. One end 15a of each inclined groove 15 is opened to one of the lug grooves 14, while the other end 15b thereof is terminated within a block. In particular, each inclined groove 15 is inclined in a direction opposite to the inclination of the lug grooves 14 so that the other end 15b terminated in the block is arranged to face toward the center of the vehicle. With this arrangement, four types of blocks, with various different shapes, defined by the three lug grooves 14 and the inclined groove 15 are disposed as a repeating unit on the land section 21. Moreover, multiple blocks defined by the lug grooves 14 are disposed in each of the land sections 22 to 24.

Multiple sipes 16 each extending in the tire width direction are formed in each of the blocks included in the land sections 21 to 24. The shape of these sipes 16 is not particularly limited, and it is thus possible to employ sipes having a zigzag or linear shape in a plan view, or those having a three-dimensional shape.

In the pneumatic tire, the tread portion 1 is partitioned into the four lines of land sections by the three main grooves 11 to 13. The width of the land section 21 closer to the center of the vehicle is set greater than the width of the land section 22 farther from the center of the vehicle. The inclined grooves 15 each having a relatively large length are provided in the land section 21 having a large width. The block rigidity is thus optimized. Accordingly, the pneumatic tire is capable of sufficiently securing the driving stability and wear resistance on dry road surfaces. Moreover, the inclined grooves 15 in the land section 21 make it possible to improve the running performance, such as driving stability and turnability, on snow.

In the pneumatic tire, the surface area Sa of a block A located in a region, closer to the center of the vehicle and closer to the other end of the corresponding inclined groove 15, of the land section 21; the surface area Sb of a block B located in a region, closer to the center of the vehicle and closer to the one end of the corresponding inclined groove 15, of the land section 21; the surface area Sc of a block C located in a region, farther from the center of the vehicle and closer to the other end of the corresponding inclined groove 15, of the land section 21; the surface area Sd of a block D located in a region, farther from the center of the vehicle and closer to the one end of the corresponding inclined groove 15, of the land section 21; the surface area Se of a block E, adjacent to the block C, in the land section 22; and the surface area Sf of a block F, adjacent to the block D, in the land section 22, are set to satisfy the following relations:

$Sa = Se \times 92\%$ to $100\%$;

$Sb = Sf \times 110\%$ to $118\%$;

$Sc = Se \times 110\%$ to $115\%$; and $Sd = Sf \times 95\%$ to $100\%$.

While the surface areas of the blocks in the land section 21 are set as described above, the four types of blocks A to D constituting a single unit are mixedly arranged in such a manner that the blocks B and C, each having a relatively large size, are positioned on the corner sides diagonally opposite to each other. This arrangement improves, in a balanced manner, the running performance on dry road surfaces and the running performance on snow.

The width W1 of the land section 21 is set at 50% to 70% of a tread contact half-width, while the width W2 of the land section 22 is set at 15% to 35% of the tread contact half-width. Setting the widths of the land sections 21 and 22 in the above-described ranges makes it possible to improve, in a balanced manner, the running performance on dry road surfaces and the running performance on snow. If the width W1 of the land section 21 is below the above-described range, the inclination of the inclined grooves 15 is insufficient, so that the driving stability on snow is reduced. On the other hand, if the width W2 of the land section 22 is below the above-described range, the driving stability and turnability on dry road surfaces are reduced. Note that, the tread contact half-width mentioned here is half the tread contact width TCW that is measured in the tire axial direction when the tire is inflated to an air pressure that corresponds to the maximum load capacity in the air pressure-load capacity correspondence table specified in JATMA YEAR BOOK (2004 edition), and then a load of 80% of the load capacity is applied to the tire.

Figure 2:
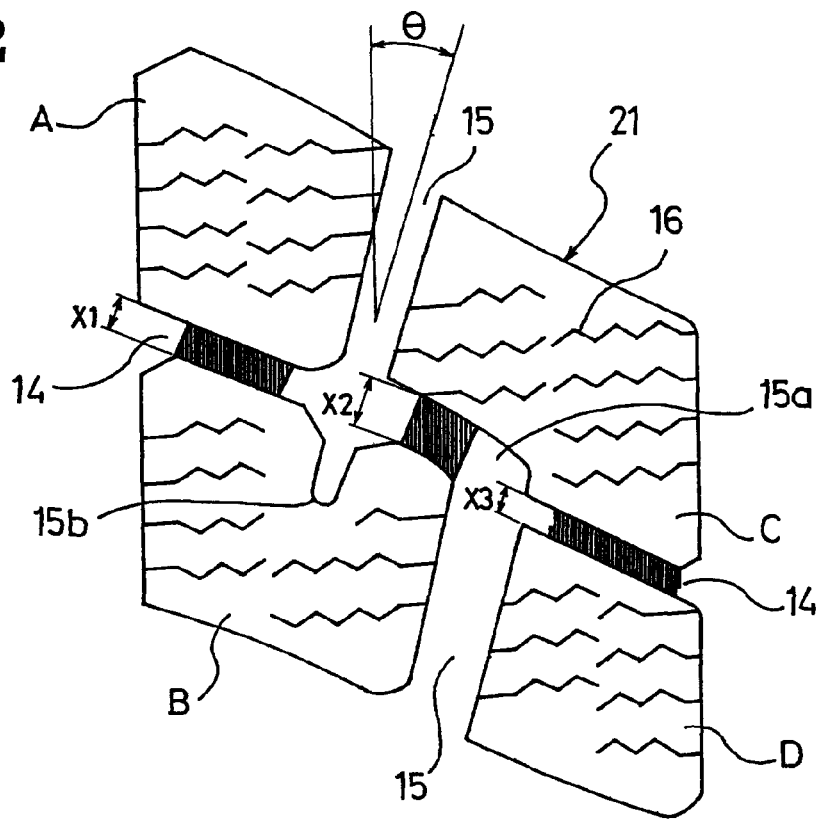
FIG. 2 is an enlarged plan view showing a first land section shown in FIG. 1.

The groove width of the lug grooves 14 is appropriately set to vary depending on the position in the tire width direction. Specifically, as shown in FIG. 2, the groove width x1 of a part of each lug groove 14, closer to the center of the vehicle, in the land section 21; the groove width x2 of a part thereof between the adjacent inclined grooves 15, 15, in the land section 21; and the groove width x3 of a part thereof, farther from the center of the vehicle, in the land section 21, are set to satisfy the following relations. It should be noted that, if the lug grooves 14 are locally enlarged at their parts communicating with the main grooves because the blocks are chamfered, the groove widths x1 and x3 are the widths of parts other than the enlarged parts.

$x2 = x1 \times 101\%$ to $180\%$, and $x3 = x1 \times 60\%$ to $99\%$.

Making smaller the groove width x3 as above reduces the groove area in a tread center region, and thus improves the running performance on dry road surfaces and on ice. Making greater the groove width x2 between the adjacent inclined grooves 15, 15 makes it possible to improve the driving stability and turnability on snow.

Figure 3:
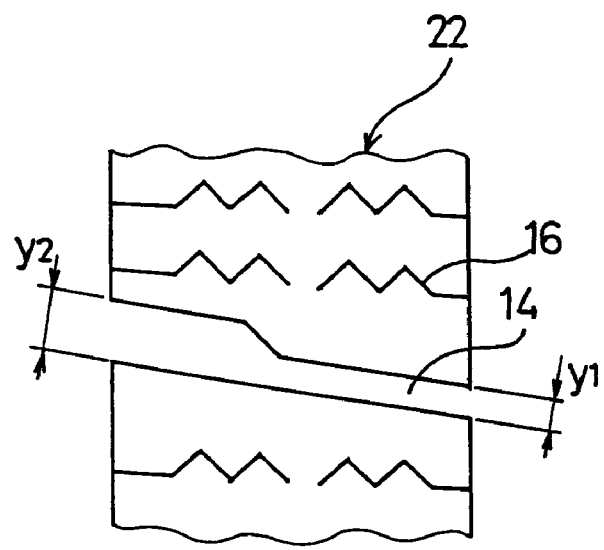
FIG. 3 is an enlarged plan view showing a second land section shown in FIG. 1.
Figure 4:
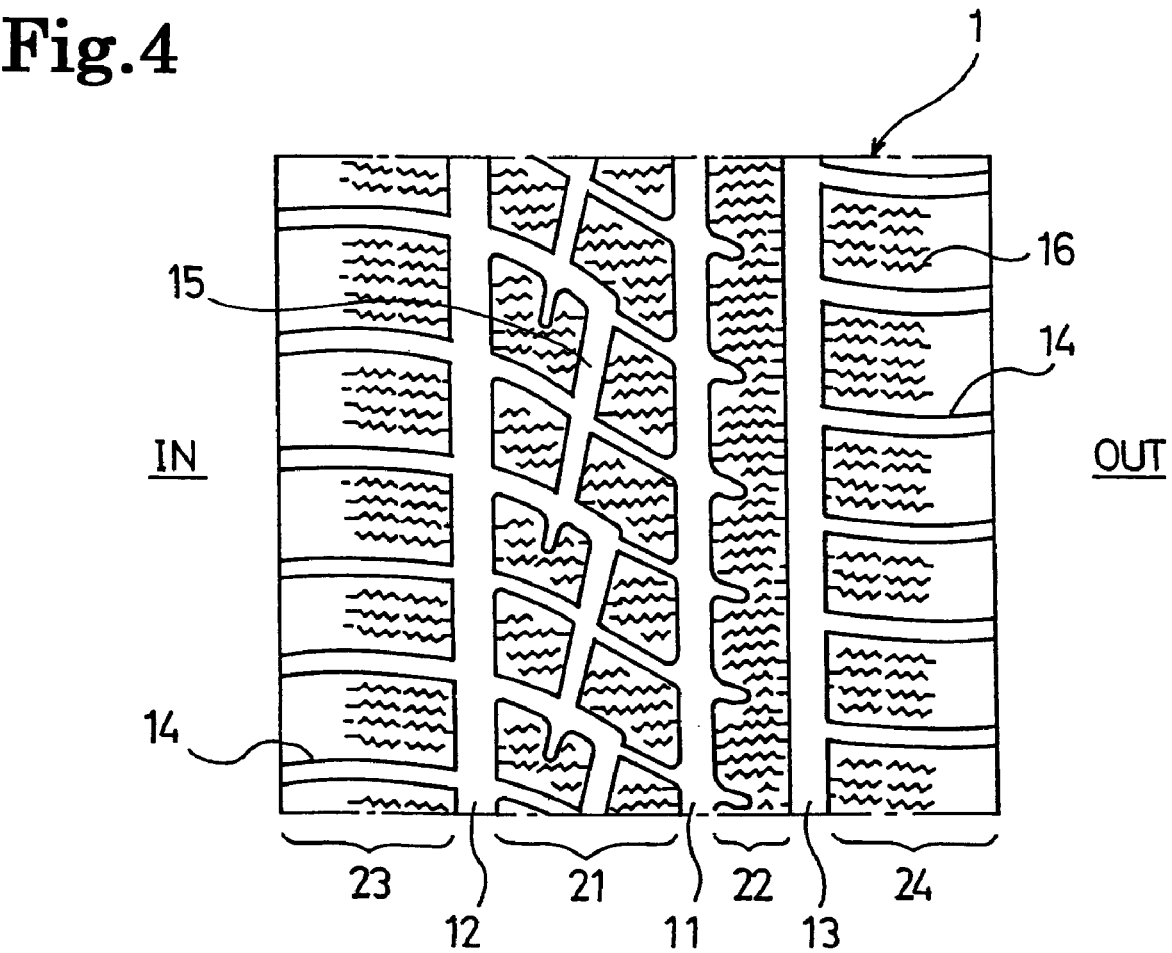
FIG. 4 is a developed view showing a modification of the tread pattern shown in FIG. 1.

As shown in FIG. 3, the groove width y1 of a part of each lug groove 14, farther from the center of the vehicle, in the land section 22 is set to be 40% to 50% of the groove width y2 of a part thereof, closer to the center of the vehicle, in the land section 22. Setting the groove width y1 smaller than the groove width y2 makes it possible to improve, in a balanced manner, the running performance on dry road surfaces and the running performance on snow. If the groove width y1 exceeds the above-described range, the turnability on dry road surfaces is reduced. By contrast, if the groove width y1 is below the above-described range, the traction performance on snow is reduced. Note that, if importance is placed on the dry performance, the lug grooves 14 may be terminated within the land section 22 (see FIG. 4).

The inclination angle θ of the inclined grooves 15 to the tire circumferential direction is set at 10° to 30°. If the inclination angle θ of the inclined grooves 15 exceeds the above-described range, the difference in dimensions among the blocks in the land section 21 becomes large, thus making the block rigidity non-uniform, leading to a reduction in the uneven wear resistance. By contrast, if the inclination angle θ is below the above-described range, the pneumatic tire cannot sufficiently exert its effect achieved by the inclined grooves 15 at the time of turning. As a result, the driving stability on snow is reduced.

The sum of the groove widths of the main grooves 11 to 13 is set at 15% to 35% of the tread contact width TCW. If the sum of the groove widths of the main grooves 11 to 13 is less than 15% of the tread contact width TCW, the wet performance is reduced; if more than 35%, the driving stability on dry road surfaces is reduced.

Figure 5:
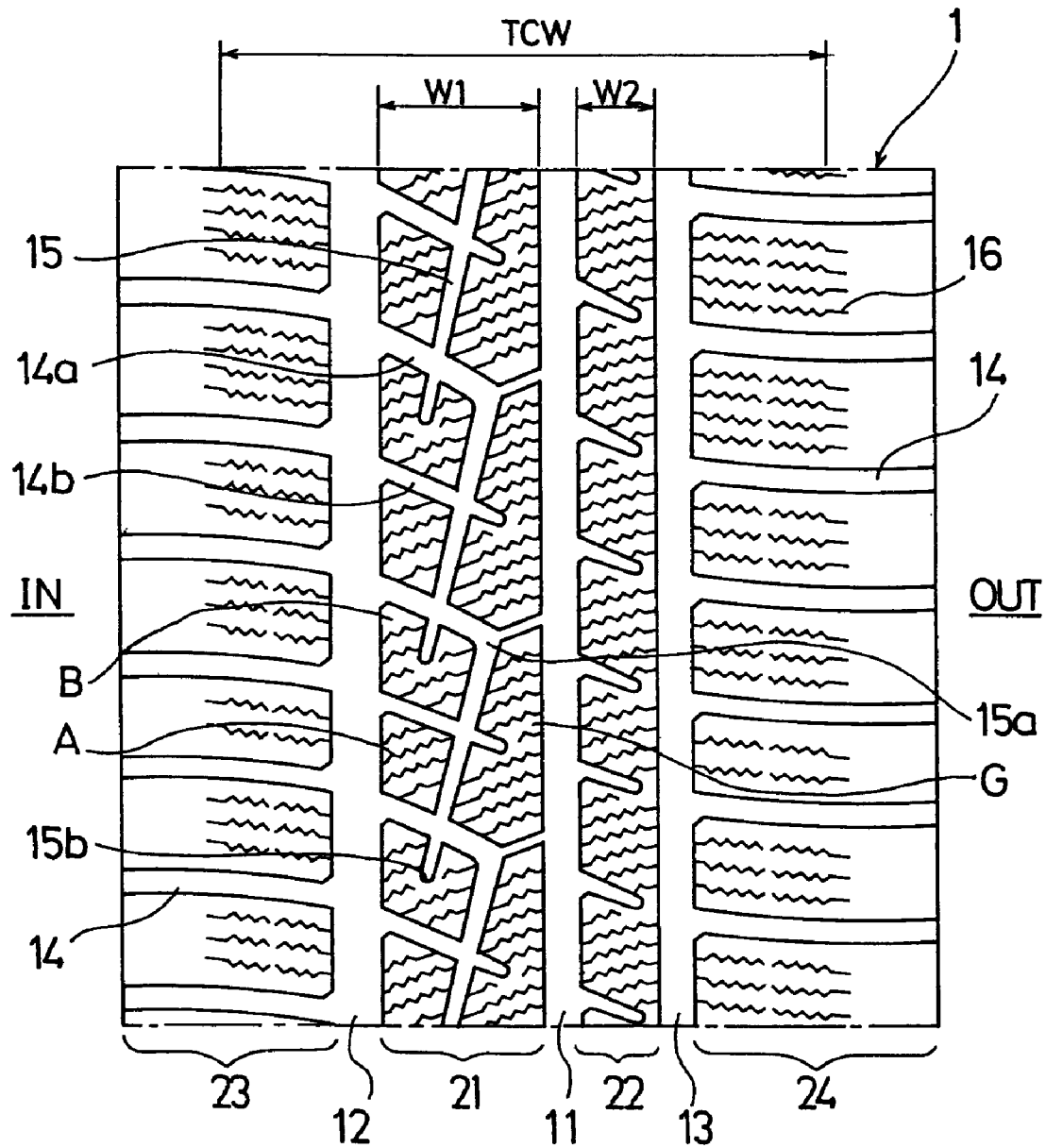
FIG. 5 is a developed view showing a tread pattern of a pneumatic tire for use on icy and snowy roads according to another embodiment of the present invention.

FIG. 5 shows a tread pattern of a pneumatic tire for use on icy and snowy roads according to another embodiment of the present invention. In the present embodiment, the same components as those shown in FIGS. 1 to 4 are denoted by the same reference numerals, and will not be described in detail.

As shown in FIG. 5, in the land section 21, multiple inclined grooves 15 are formed, each of which communicates with three of the lug grooves 14 while being inclined to the tire circumferential direction. The one end 15a of each inclined groove 15 is opened to one of the lug grooves 14, while the other end 15b thereof is terminated within a block. In the land section 21, among the three lug grooves 14 with which each inclined groove 15 communicates, while lug grooves 14a located on both end sides communicate with the main groove 11, a lug groove 14b located in the middle does not communicate with the main groove 11. With this arrangement, three types of blocks being defined by a set of the three lug grooves 14a, 14b and one of the inclined grooves 15 and having different shapes are disposed as a repeating unit. In addition, a block G located in a region, farther from the center of the vehicle, of the land section 21 is relatively large, as compared with a block A located in a region, closer to the center of the vehicle and closer to the other end of the inclined groove 15, of the land section 21 as well as a block B located in a region, closer to the center of the vehicle and closer to the one end of the inclined groove 15, of the land section 21. The length of the block G in the circumferential direction is approximately the same as the total length of the set of the blocks A and B in the circumferential direction.

In the pneumatic tire, the tread portion 1 is partitioned into the four lines of land sections by the three main grooves 11 to 13. The width of the land section 21 closer to the center of the vehicle is set greater than the width of the land section 22 farther from the center of the vehicle. The inclined grooves 15, each having a relatively large length, are provided in the land section 21 having a large width. The block rigidity is thereby optimized. Accordingly, the pneumatic tire is capable of sufficiently securing driving stability and wear resistance on dry road surfaces. Moreover, the inclined grooves 15 in the land section 21 make it possible to improve the running performance, such as driving stability and turnability, on snow. In particular, the increase in size of the block G located in the tread center region significantly improves the driving stability on dry road surfaces.

Figure 6:
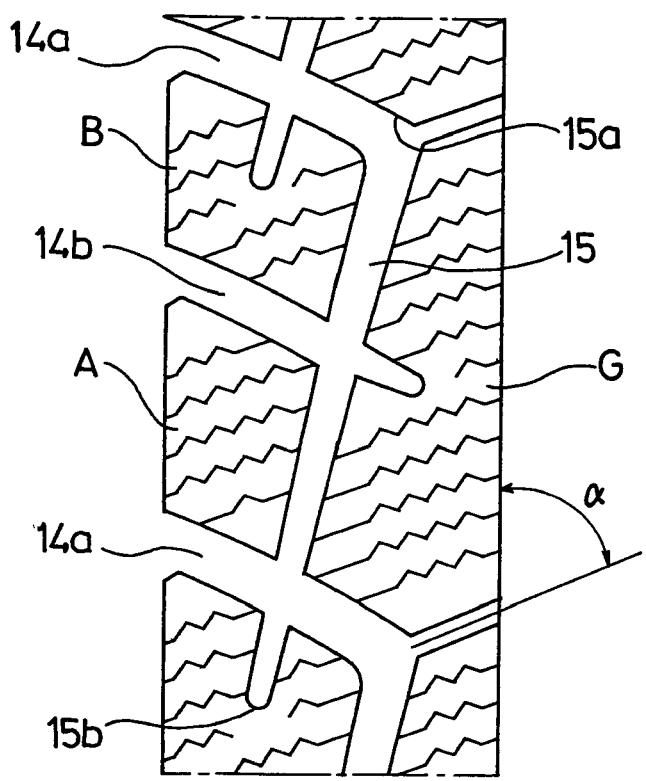
FIG. 6 is an enlarged plan view showing a first land section shown in FIG. 5.
Figure 7:
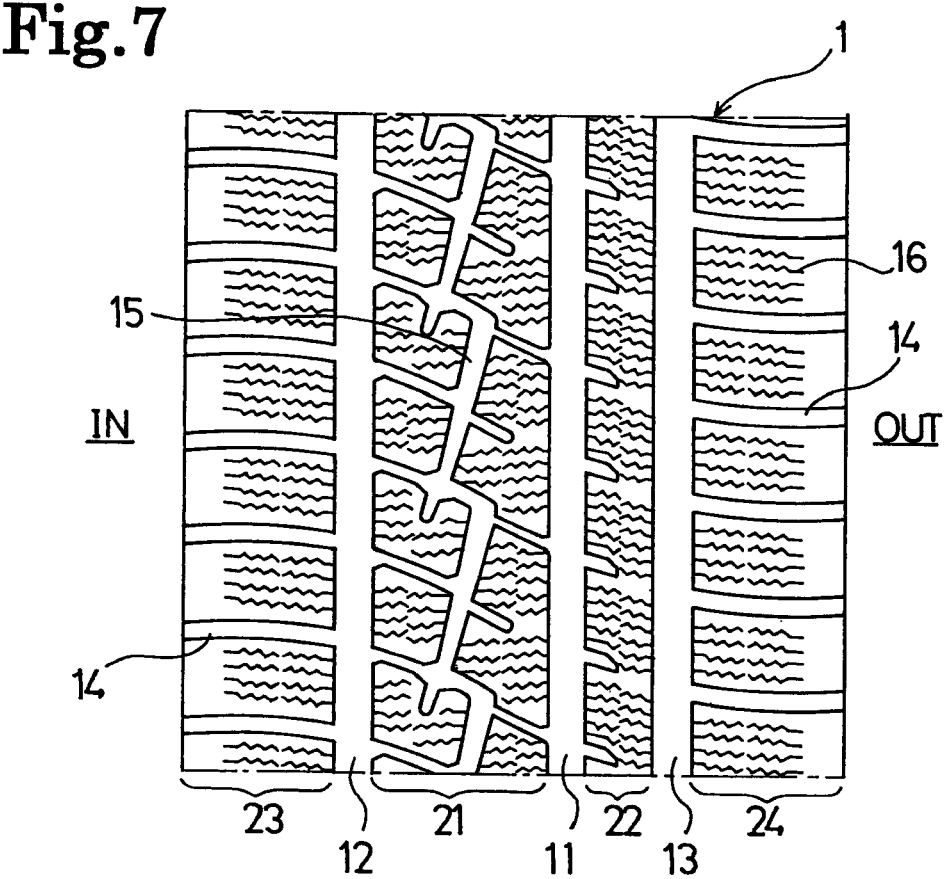
FIG. 7 is a developed view showing a modification of the tread pattern shown in FIG. 5.

Here, as shown in FIG. 6 the inclination angle α of a part, contiguous with the block G, of each lug groove 14a with respect to the tire circumferential direction is preferably set at 60° to 90°. This arrangement makes it possible to sufficiently secure the rigidity of the block G. If the inclination angle α is below 60°, the rigidity of the block G is reduced, and thus, the effect of improving the driving stability is reduced. Note that, the part, contiguous with the block G, of each lug groove 14a may be inclined in any direction with respect to the tire circumferential direction (see FIG. 7).

The preferred embodiments of the present invention have been so far described in detail. However, it should be understood that various modifications, substitutions, and replacements can be made to the embodiments without departing from the spirit and scope of the present invention defined by the attached scope of claims.

EXAMPLES

Pneumatic tires for use on icy and snowy roads of Conventional Example and Examples 1 to 3 were prepared. These tires had a tire size of 205/55R16 while their tread patterns were made different from one another.

Conventional Example had a tread portion in which five main grooves each extending in the tire circumferential direction and multiple lug grooves each extending in the tire width direction were provided, so that a large number of rectangular blocks were defined by these main grooves and lug grooves. On the other hand, Example 1 had the tread pattern shown in FIG. 1, Example 2 has the tread pattern shown in FIG. 4, and Example 3 had the tread pattern shown in FIG. 5. Each of Examples 1 to 3 had the following configuration. The width of the first land section was set at 56% of the tread contact half-width, while the width of the second land section was set at 27% of the tread contact half-width. The inclination angle of the inclined grooves to the tire circumferential direction was set at 15°. The sum of the groove widths of the first, second, and third main grooves, was set at 21.4% of the tread contact width.

Each of these test tires was evaluated by the following test methods in terms of the driving stability on dry road surfaces, the driving stability on snow, the turnability on snow, and the wear resistance. The results of evaluation are shown in Table 1.

Driving Stability on Dry Road Surfaces:

Each test tire was fitted onto a wheel with a rim size of 16×6.5J and inflated to an air pressure of 200 kPa, and then the test tire with the wheel was mounted on a rear-wheel-drive vehicle with a displacement of 2000 cc. Then, the vehicle was driven by a test driver on a test course with a dry road surface, so that sensory evaluation was performed on the test tire. The results of evaluation are indicated by indices where the result of Conventional Example is taken as an index of 100. The larger the index is, it means that the more excellent the pneumatic tire is in the driving stability on dry road surfaces.

Driving Stability on Snow:

Each test tire was fitted onto a wheel with a rim size of 16×6.5J and inflated to an air pressure of 200 kPa, and then the test tire with the wheel was mounted on a rear-wheel-drive vehicle with a displacement of 2000 cc. Then, the vehicle was driven by a test driver on a snowy test course, so that sensory evaluation was performed on the test tire. The results of evaluation are indicated by indices where the result of Conventional Example is taken as an index of 100. The larger the index is, it means that the more excellent the pneumatic tire is in the driving stability on snow.

Turnability on Snow:

Each test tire was fitted onto a wheel with a rim size of 16×6.5J and inflated to an air pressure of 200 kPa, and then the test tire with the wheel was mounted on a rear-wheel-drive vehicle with a displacement of 2000 cc. Then, the vehicle was driven by a test driver on a snowy test course, so that sensory evaluation was performed on the test tire. The results of evaluation are indicated by indices where the result of Conventional Example is taken as an index of 100. The larger the index is, it means that the more excellent the pneumatic tire is in the turnability on snow.

Wear Resistance:

Each test tire was fitted onto a wheel with a rim size of 16×6.5J and inflated to an air pressure of 200 kPa, and then the test tire with the wheel was mounted on a rear-wheel-drive vehicle with a displacement of 2000 cc. Then, after the vehicle was driven on a dry road surface for approximately 10,000 km, the amount of wear at the tread center position on the tire was measured. The results of evaluation are indicated by indices obtained from the reciprocals of the measured values where the result of Conventional Example is taken as an index of 100. The larger the index is, it means that the more excellent the pneumatic tire is in the wear resistance.

TABLE 1

| | Conventional Example | Example 1 | Example 2 | Example 3 |
|---|---|---|---|---|
| Driving Stability on Dry Road Surfaces | 100 | 110 | 112 | 114 |
| Driving Stability on Snow | 100 | 105 | 103 | 102 |
| Turnability on Snow | 100 | 107 | 103 | 102 |
| Wear Resistance | 100 | 105 | 105 | 103 |

As can be understood from Table 1, the tires of Examples 1 to 3 were excellent in the driving stability on dry road surfaces, the driving stability on snow, the turnability on snow, and the wear resistance, as compared with the tire of Conventional Example. Particularly, the tire of Example 3 exhibited a significant effect of improving the driving stability on dry road surfaces.

What is claimed is:

1. A pneumatic tire that is designed to be mounted on a vehicle so that a designated side of the tire should face to the outside of the vehicle, the pneumatic tire characterized by comprising a tread portion provided with:
a first main groove extending in a tire circumferential direction;
a second main groove extending in the tire circumferential direction in a shoulder region closer to the center of the vehicle than the first main groove;
a third main groove extending in the tire circumferential direction in a shoulder region farther from the center of the vehicle than the first main groove; and
a plurality of lug grooves each extending from one shoulder side to the other shoulder side,
the pneumatic tire being characterized in that:
a width of a first land section defined between the first and second main grooves is set greater than a width of a second land section defined between the first and third main grooves, a plurality of inclined grooves are provided in the first land section, each inclined groove communicating with at least three of the lug grooves while being inclined to the tire circumferential direction, and one end of each inclined groove is opened to one of the lug grooves while the other end thereof is terminated within a block, wherein a groove width x1 of a part of the lug groove, closer to the center of the vehicle, in the first land section; a groove width x2 of a part thereof, between a pair of the adjacent inclined grooves, in the first land section; and a groove width x3 of a part thereof, farther from the center of the vehicle, in the first land section, satisfy the following relations:

$x2=x1\times 101\%$ to $180\%$; and $x3=x1\times 60\%$ to $99\%$.

2. The pneumatic tire according to claim 1, wherein:

each inclined groove communicates with three of the lug grooves, so that four types of blocks defined by the three lug grooves and the inclined groove are disposed as a repeating unit in the first land section, a plurality of blocks defined by the plurality of lug grooves are disposed in the second land section, and a surface area Sa of a block A located in a region, closer to the center of the vehicle and closer to the other end of the inclined groove, of the first land section; a surface area Sb of a block B located in a region, closer to the center of the vehicle and closer to the one end of the inclined groove, of the first land section; a surface area Sc of a block C located in a region, farther from the center of the vehicle and closer to the other end of the inclined groove, of the first land section; a surface area Sd of a block D located in a region, farther from the center of the vehicle and closer to the one end of the inclined groove, of the first land section; a surface area Se of a block E, adjacent to the block C, in the second land section; and a surface area Sf of a block F, adjacent to the block D, in the second land section, satisfy the following relations:

$Sa=Se\times 92\%$ to $100\%$;

$Sb=Sf\times 110\%$ to $118\%$;

$Sc=Se\times 110\%$ to $115\%$;

$Sd=Sf\times 95\%$ to $100$.

3. The pneumatic tire according to claim 1, wherein:

each inclined groove communicates with three of the lug grooves, among the three lug grooves in the first land section, while lug grooves located on both end sides communicate with the first main groove, a lug groove located in the middle does not communicate with the first main groove, three types of blocks defined by the three lug grooves and the inclined groove are disposed as a repeating unit in the first land section, and a block G located in a region, farther from the center of the vehicle, of the first land section is relatively large, as compared with a block A located in a region, closer to the center of the vehicle and closer to the other end of the inclined groove, of the first land section as well as a block B located in a region, closer to the center of the vehicle and closer to the one end of the inclined groove, of the first land section.

4. The pneumatic tire according to claim 3, wherein an inclination angle of a part, contiguous with the block G, of the lug groove with respect to the tire circumferential direction is set at 60° to 90°.

5. The pneumatic tire according to any one of claims 1 to 4, wherein:

the width of the first land section is set at 50% to 70% of a tread contact half-width, and the width of the second land section is set at 15% to 35% of the tread contact half-width.

6. The pneumatic tire according to any one of claims 1 to 4, wherein a groove width y1 of a part of each lug groove, farther from the center of the vehicle, in the second land section is set to be 40% to 50% of a groove width y2 of a part thereof, closer to the center of the vehicle, in the second land section.

7. The pneumatic tire according to any one of claims 1 to 4, wherein an inclination angle of the inclined grooves to the tire circumferential direction is set at 10° to 30°.

8. The pneumatic tire according to any one of claims 1 to 4, wherein a sum of groove widths of the first, second, and third main grooves, is set at 15% to 35% of a tread contact width.

9. The pneumatic tire according to any one of claims 1 to 4, wherein a plurality of sipes each extending in the tire width direction are provided in each of land sections including the first and second land sections.

* * * * *